United States Patent
Holtzman et al.

(10) Patent No.: US 7,934,049 B2
(45) Date of Patent: Apr. 26, 2011

(54) METHODS USED IN A SECURE YET FLEXIBLE SYSTEM ARCHITECTURE FOR SECURE DEVICES WITH FLASH MASS STORAGE MEMORY

(75) Inventors: Micky Holtzman, Kfar-Vradim (IL); Hagai Bar-El, Rehovot (IL); Ronen Greenspan, Kiryat Yam (IL); Rony Shapiro, Tel Aviv (IL)

(73) Assignees: SanDisk Corporation, Milpitas, CA (US); Discretix Technologies Ltd., Netanya (IL)

( * ) Notice: Subject to any disclaimer, the term of this patent is extended or adjusted under 35 U.S.C. 154(b) by 80 days.

(21) Appl. No.: 11/317,341

(22) Filed: Dec. 22, 2005

(65) Prior Publication Data

US 2007/0061581 A1    Mar. 15, 2007

Related U.S. Application Data

(60) Provisional application No. 60/717,164, filed on Sep. 14, 2005.

(51) Int. Cl.
*G06F 12/00* (2006.01)
*G06F 13/00* (2006.01)
*G06F 13/28* (2006.01)

(52) U.S. Cl. ............... 711/103; 713/1; 713/2; 713/100

(58) Field of Classification Search ............ 711/103; 713/1, 2, 100
See application file for complete search history.

(56) References Cited

U.S. PATENT DOCUMENTS

| | | | |
|---|---|---|---|
| 4,549,896 A | 10/1985 | Streicher et al. | 65/135 |
| 4,590,552 A | 5/1986 | Guttag et al. | 364/200 |
| 4,713,753 A | 12/1987 | Boebert et al. | 364/200 |
| 4,780,905 A | 10/1988 | Cruts et al. | 380/44 |
| 4,797,853 A | 1/1989 | Savage et al. | 364/900 |

(Continued)

FOREIGN PATENT DOCUMENTS

EP    0 087 143 A1    8/1983

(Continued)

OTHER PUBLICATIONS

Federal Information Processing Standards Publications 180-2, "Secure Hash Standard", Aug. 1, 2002, pp. 1-75, http://csrc.nist.gov/publications/fips/fips180-2/fips180-2.pdf.*

(Continued)

*Primary Examiner* — Matt Kim
*Assistant Examiner* — Christopher D Birkhimer
(74) *Attorney, Agent, or Firm* — Brinks Hofer Gilson & Lione (57) ABSTRACT

A device with mass storage capability that uses a readily available non secure memory for the mass storage but has firmware (and hardware) that provides security against unauthorized copying of data. This is true even though the firmware itself is stored in the non secure mass storage memory, and therefore potentially vulnerable to hacking. An indication of the authenticity of the firmware must be present before it will be executed by the device. This protects the device contents from unauthorized duplication or tampering. Additional functionality can be added to the device with additional firmware applications, and the authenticity of those additional applications will also be verified before they will be executed. This further prevents unauthorized copying or tampering of secure content through any mechanisms that may be unscrupulously introduced. Any data within the mass storage memory may also be encrypted.

21 Claims, 8 Drawing Sheets

U.S. PATENT DOCUMENTS

| | | | |
|---|---|---|---|
| 4,907,268 A | 3/1990 | Bosen et al. | 380/4 |
| 5,006,823 A | 4/1991 | Baril et al. | 333/164 |
| 5,065,429 A | 11/1991 | Lang | 380/25 |
| 5,129,074 A * | 7/1992 | Kikuchi et al. | 711/173 |
| 5,235,641 A | 8/1993 | Nozawa et al. | 380/21 |
| 5,268,870 A | 12/1993 | Harari | |
| 5,293,424 A | 3/1994 | Hotley et al. | 380/23 |
| 5,311,595 A | 5/1994 | Bjerrum et al. | 380/25 |
| 5,319,765 A | 6/1994 | Kimura | 395/425 |
| 5,327,563 A | 7/1994 | Singh | 395/700 |
| 5,404,485 A | 4/1995 | Ban | 395/425 |
| 5,438,575 A | 8/1995 | Bertrand | 371/48 |
| 5,442,704 A | 8/1995 | Hotley et al. | 380/23 |
| 5,455,862 A | 10/1995 | Hoskinson | 380/21 |
| 5,477,039 A | 12/1995 | Lisimaque et al. | 235/380 |
| 5,530,862 A * | 6/1996 | Wadsworth et al. | 713/1 |
| 5,596,738 A * | 1/1997 | Pope | 711/103 |
| 5,606,660 A | 2/1997 | Estakhri et al. | 395/183.14 |
| 5,629,513 A | 5/1997 | Geronimi et al. | 235/492 |
| 5,710,639 A | 1/1998 | Kuznicki et al. | 358/426 |
| 5,825,882 A | 10/1998 | Kowalski et al. | 380/25 |
| 5,857,020 A | 1/1999 | Peterson, Jr. | 380/4 |
| 5,860,082 A | 1/1999 | Smith et al. | 711/103 |
| RE36,181 E | 4/1999 | Koopman, Jr. et al. | 380/23 |
| 5,917,909 A | 6/1999 | Lamla | 705/67 |
| 5,933,854 A | 8/1999 | Yoshimura | 711/164 |
| 5,943,423 A | 8/1999 | Muftic | 380/25 |
| 5,956,405 A | 9/1999 | Yuval | 380/29 |
| 5,987,134 A | 11/1999 | Shin et al. | 380/25 |
| 5,995,623 A * | 11/1999 | Kawano et al. | 713/189 |
| 5,995,965 A | 11/1999 | Experton | 707/10 |
| 6,026,402 A | 2/2000 | Vossen et al. | 707/9 |
| 6,028,933 A | 2/2000 | Heer et al. | 380/9 |
| 6,073,234 A | 6/2000 | Kigo et al. | 713/161 |
| 6,101,588 A | 8/2000 | Farley et al. | 711/168 |
| 6,148,354 A | 11/2000 | Ban et al. | 710/102 |
| 6,154,544 A | 11/2000 | Farris et al. | 380/262 |
| 6,158,004 A | 12/2000 | Mason et al. | 713/200 |
| 6,181,252 B1 | 1/2001 | Nakano | 340/825.31 |
| 6,182,229 B1 | 1/2001 | Nielsen | 713/202 |
| 6,230,223 B1 | 5/2001 | Olarig | 710/126 |
| 6,230,233 B1 | 5/2001 | Lofgren et al. | |
| 6,243,816 B1 | 6/2001 | Fang et al. | 713/202 |
| 6,253,328 B1 | 6/2001 | Smith, Jr. | 713/202 |
| 6,353,888 B1 | 3/2002 | Kakehi et al. | 713/168 |
| 6,356,941 B1 | 3/2002 | Cohen | 709/219 |
| 6,370,251 B1 | 4/2002 | Hardy et al. | 380/286 |
| 6,371,377 B2 | 4/2002 | Asoh et al. | 235/487 |
| 6,385,729 B1 | 5/2002 | DiGiorgio et al. | 713/201 |
| 6,389,542 B1 | 5/2002 | Flyntz | 713/201 |
| 6,393,565 B1 | 5/2002 | Lockhart et al. | 713/172 |
| 6,422,460 B1 | 7/2002 | Boesch | 235/380 |
| 6,434,700 B1 | 8/2002 | Alonso et al. | 713/169 |
| 6,445,794 B1 | 9/2002 | Shefi | 380/46 |
| 6,457,126 B1 | 9/2002 | Nakamura et al. | 713/166 |
| 6,522,655 B1 | 2/2003 | Laiho | 370/410 |
| 6,571,335 B1 * | 5/2003 | O'Donnell et al. | 713/173 |
| 6,577,734 B1 | 6/2003 | Etzel et al. | 380/277 |
| 6,615,347 B1 | 9/2003 | de Silva et al. | 713/156 |
| 6,615,352 B2 | 9/2003 | Terao et al. | 713/184 |
| 6,629,192 B1 | 9/2003 | Schaefer et al. | 711/103 |
| 6,671,808 B1 | 12/2003 | Abbott et al. | 713/200 |
| 6,678,828 B1 | 1/2004 | Pham et al. | 713/201 |
| 6,742,117 B1 | 5/2004 | Hikita et al. | 713/172 |
| 6,754,765 B1 | 6/2004 | Chang et al. | 711/103 |
| 6,763,399 B2 | 7/2004 | Margalit et al. | 710/13 |
| 6,783,078 B1 | 8/2004 | Leaming | 235/492 |
| 6,788,575 B2 * | 9/2004 | Kozakai et al. | 365/185.09 |
| 6,804,786 B1 | 10/2004 | Chamley et al. | 713/201 |
| 6,810,123 B2 | 10/2004 | Farris et al. | 380/262 |
| 6,829,676 B2 | 12/2004 | Maeda et al. | 711/103 |
| 6,832,731 B2 | 12/2004 | Kaneko | 235/492 |
| 6,845,908 B2 | 1/2005 | Morita et al. | 235/382 |
| 6,848,045 B2 | 1/2005 | Long et al. | 713/4 |
| 6,865,555 B2 | 3/2005 | Novak | 705/59 |
| 6,880,079 B2 | 4/2005 | Kefford et al. | 713/155 |
| 6,892,304 B1 * | 5/2005 | Galasso et al. | 713/189 |
| 6,901,499 B2 * | 5/2005 | Aasheim et al. | 711/205 |
| 6,928,547 B2 | 8/2005 | Brown et al. | 713/186 |
| 7,036,020 B2 | 4/2006 | Thibadeau | |
| 7,058,818 B2 | 6/2006 | Dariel | 713/189 |
| 7,062,616 B2 | 6/2006 | Sadhasivan et al. | 711/153 |
| 7,120,729 B2 | 10/2006 | Gonzalez et al. | 711/103 |
| 7,149,890 B2 | 12/2006 | Justen | |
| 7,215,771 B1 | 5/2007 | Hamlin | |
| 7,380,275 B2 | 5/2008 | Srinivasan et al. | |
| 7,426,747 B2 | 9/2008 | Thibadeau | 713/270 |
| 7,493,656 B2 | 2/2009 | Goodwill et al. | |
| 7,657,886 B1 | 2/2010 | Chen et al. | |
| 2001/0019614 A1 | 9/2001 | Madoukh | 380/277 |
| 2001/0025355 A1 | 9/2001 | Palm et al. | 714/726 |
| 2001/0037435 A1 * | 11/2001 | Van Doren | 711/153 |
| 2002/0029343 A1 | 3/2002 | Kurita | 713/185 |
| 2002/0034303 A1 | 3/2002 | Farris et al. | 380/270 |
| 2002/0065730 A1 | 5/2002 | Nii | 705/26 |
| 2002/0099666 A1 | 7/2002 | Dryer et al. | 705/71 |
| 2002/0141588 A1 | 10/2002 | Rollins | 380/277 |
| 2002/0145632 A1 | 10/2002 | Shmueli et al. | 345/835 |
| 2002/0174337 A1 | 11/2002 | Aihara | 713/172 |
| 2002/0176575 A1 | 11/2002 | Qawami et al. | 380/201 |
| 2002/0178370 A1 | 11/2002 | Gurevich et al. | 713/189 |
| 2002/0184435 A1 | 12/2002 | Lambino et al. | |
| 2002/0186842 A1 | 12/2002 | Sabet-Sharghi et al. | 380/200 |
| 2002/0191794 A1 | 12/2002 | Farris et al. | 380/260 |
| 2003/0018889 A1 | 1/2003 | Burnett et al. | 713/153 |
| 2003/0028514 A1 | 2/2003 | Lord et al. | 707/1 |
| 2003/0028797 A1 | 2/2003 | Long et al. | 713/194 |
| 2003/0061504 A1 | 3/2003 | Sprigg et al. | 713/200 |
| 2003/0070083 A1 | 4/2003 | Nessler | 713/193 |
| 2003/0101327 A1 * | 5/2003 | Beck | 711/206 |
| 2003/0110169 A1 | 6/2003 | Zuili et al. | 707/9 |
| 2003/0120938 A1 | 6/2003 | Mullor | 713/190 |
| 2003/0123287 A1 | 7/2003 | Gorobets | |
| 2003/0131210 A1 | 7/2003 | Mueller | 711/200 |
| 2003/0135739 A1 | 7/2003 | Talton, Sr. | 713/185 |
| 2003/0149886 A1 | 8/2003 | Ito et al. | 713/193 |
| 2003/0156473 A1 | 8/2003 | Sinclair et al. | 365/200 |
| 2003/0177319 A1 | 9/2003 | De Jong | |
| 2003/0204726 A1 | 10/2003 | Kefford et al. | 713/171 |
| 2003/0212894 A1 | 11/2003 | Buck et al. | 713/184 |
| 2004/0024917 A1 * | 2/2004 | Kennedy et al. | 710/1 |
| 2004/0025010 A1 * | 2/2004 | Azema et al. | 713/156 |
| 2004/0025011 A1 * | 2/2004 | Azema et al. | 713/156 |
| 2004/0025027 A1 * | 2/2004 | Balard et al. | 713/183 |
| 2004/0025036 A1 * | 2/2004 | Balard et al. | 713/189 |
| 2004/0044625 A1 | 3/2004 | Sakamura et al. | 705/41 |
| 2004/0054907 A1 * | 3/2004 | Chateau et al. | 713/175 |
| 2004/0059916 A1 | 3/2004 | Katayama | |
| 2004/0063495 A1 * | 4/2004 | LeMay et al. | 463/42 |
| 2004/0066936 A1 | 4/2004 | Farris et al. | 380/270 |
| 2004/0083335 A1 | 4/2004 | Gonzalez et al. | |
| 2004/0083370 A1 | 4/2004 | de Jong | 713/182 |
| 2004/0093592 A1 * | 5/2004 | Rao | 717/168 |
| 2004/0098585 A1 | 5/2004 | Grove et al. | 713/168 |
| 2004/0103288 A1 | 5/2004 | Ziv et al. | 713/185 |
| 2004/0117653 A1 | 6/2004 | Shapira et al. | 713/201 |
| 2004/0123127 A1 | 6/2004 | Teicher et al. | 713/193 |
| 2004/0128523 A1 | 7/2004 | Fujioka | 713/189 |
| 2004/0132437 A1 | 7/2004 | Ohmori et al. | 455/414.1 |
| 2004/0139021 A1 | 7/2004 | Reed et al. | 705/50 |
| 2004/0148536 A1 | 7/2004 | Zimmer et al. | |
| 2004/0153642 A1 | 8/2004 | Plotkin et al. | 713/150 |
| 2004/0168081 A1 | 8/2004 | Ladas et al. | 713/201 |
| 2004/0186946 A1 | 9/2004 | Lee | |
| 2004/0186994 A1 | 9/2004 | Herbert et al. | 713/164 |
| 2004/0193925 A1 | 9/2004 | Safriel | 713/202 |
| 2004/0230963 A1 * | 11/2004 | Rothman et al. | 717/168 |
| 2004/0264254 A1 * | 12/2004 | Eggleston et al. | 365/185.33 |
| 2005/0010758 A1 | 1/2005 | Landrock et al. | 713/156 |
| 2005/0010783 A1 | 1/2005 | Libin et al. | 713/182 |
| 2005/0015588 A1 | 1/2005 | Lin et al. | 713/159 |
| 2005/0033968 A1 | 2/2005 | Dupouy et al. | 713/183 |
| 2005/0049931 A1 | 3/2005 | Wisnudel et al. | 705/26 |
| 2005/0050330 A1 | 3/2005 | Agam et al. | 713/172 |
| 2005/0055530 A1 | 3/2005 | Wu et al. | |
| 2005/0091496 A1 * | 4/2005 | Hyser | 713/175 |
| 2005/0114620 A1 | 5/2005 | Justen | 711/170 |

| | | | |
|---|---|---|---|
| 2005/0120205 A1 | 6/2005 | Umezawa et al. | 713/156 |
| 2005/0137997 A1* | 6/2005 | Bussert et al. | 707/1 |
| 2005/0160217 A1 | 7/2005 | Gonzalez et al. | 711/6 |
| 2005/0185493 A1* | 8/2005 | Fujioka et al. | 365/230.05 |
| 2005/0190599 A1* | 9/2005 | Eggleston et al. | 365/185.11 |
| 2005/0193161 A1* | 9/2005 | Lee et al. | 711/103 |
| 2005/0193206 A1* | 9/2005 | Kunisa et al. | 713/176 |
| 2006/0176068 A1 | 8/2006 | Holtzman et al. | 324/765 |
| 2006/0177064 A1 | 8/2006 | Holtzman et al. | 380/277 |
| 2006/0242151 A1 | 10/2006 | Jogand-Coulomb et al. | 707/9 |
| 2007/0011724 A1 | 1/2007 | Gonzalez et al. | 726/4 |
| 2007/0061570 A1 | 3/2007 | Holtzman et al. | 713/168 |
| 2007/0061581 A1 | 3/2007 | Holtzman et al. | 713/176 |
| 2007/0061597 A1 | 3/2007 | Holtzman et al. | 713/193 |
| 2007/0061897 A1 | 3/2007 | Holtzman et al. | 726/34 |
| 2009/0055655 A1 | 2/2009 | Ziv et al. | |
| 2009/0119501 A1 | 5/2009 | Petersen | |
| 2009/0119517 A1 | 5/2009 | Ziv et al. | |

FOREIGN PATENT DOCUMENTS

| | | |
|---|---|---|
| EP | 0 461 983 A1 | 12/1991 |
| EP | 0 461 983 B1 | 4/1995 |
| EP | 849657 A1 * | 6/1998 |
| EP | 0 919 904 A2 | 8/1998 |
| EP | 1 004 992 A3 | 5/2000 |
| EP | 1 074 906 A1 | 8/2000 |
| EP | 1 209 657 A1 | 8/2000 |
| EP | 1 273 996 A2 | 1/2003 |
| EP | 1 351 151 A2 | 10/2003 |
| EP | 1 467 312 A1 | 4/2004 |
| EP | 1 429 224 A1 | 6/2004 |
| EP | 1 487 170 A2 | 6/2004 |
| EP | 1429224 A1 * | 6/2004 |
| EP | 1 457 922 A3 | 9/2004 |
| EP | 1 496 419 A1 | 1/2005 |
| GB | 2 391 082 A | 7/2002 |
| JP | 2002288453 | 10/2002 |
| JP | 2003-067208 A | 3/2003 |
| JP | 2004-280284 A | 10/2004 |
| JP | 2004-280287 A | 10/2004 |
| WO | WO 99/47989 | 9/1999 |
| WO | WO 99/64996 | 12/1999 |
| WO | WO 00/48063 | 8/2000 |
| WO | WO 02/25415 | 3/2002 |
| WO | WO 02/48846 A2 | 6/2002 |
| WO | WO 02/103495 A1 | 12/2002 |
| WO | WO 2003/081544 A2 | 10/2003 |
| WO | WO 03/096287 A1 | 11/2003 |
| WO | WO 2004/040578 A2 | 5/2004 |
| WO | WO 2004/040586 A1 | 5/2004 |
| WO | WO 2004/086228 A1 | 10/2004 |
| WO | WO 2004/092886 A2 | 10/2004 |
| WO | WO 2004/112036 A1 | 12/2004 |
| WO | WO 2005/001653 A2 | 1/2005 |
| WO | WO 2005/010686 A2 | 2/2005 |
| WO | WO 2005/010688 A2 | 2/2005 |
| WO | WO 2005/013125 A1 | 2/2005 |
| WO | 2005/019974 A2 | 3/2005 |

OTHER PUBLICATIONS

ISA/EPO, "Invitation to Pay Additional Fees," mailed on Mar. 8, 2007 in corresponding Int'l. App. No. PCT/US2006/003876, 7 pages.
ISA/EPO, "Notification of Transmittal of the International Search Report and the Written Opinion of the International Searching Authority, or the Declaration," mailed on Aug. 17, 2007 in corresponding Int'l. App. No. PCT/US2006/003876, 19 pages.
RFC 3566—The AES-XCBC-MAC-96 Algorithm and Its Use With IPsec by Sheila Frankel, NIST—National Institute of Standards and Technology, 820 West Diamond Ave, Room 677, Gaithersburg, MD 20899, http://www.faqs.org/rfcs/rfc3566.html, 10 pages.
Performance Comparison of Message Authentication Code (MAC) Algorithms for the Internet Protocol Security (IPSEC) by Janaka Deepakumara, Howard M. Heys and R. Venkatesan, Electrical and Computer Engineering, Memorial University of Newfoundland, St. John's, NL, Canada, A1B3S7 http://www.engr.mun.ca/~howard/PAPERS/necec_2003b.pdf, 7 pages.
Comments to NIST concerning AES Modes of Operations: A Suggestion for Handling Arbitrary-Length Messages with the CBC MAC by John Black, University of Nevada, Reno, Phillip Rogaway, University of California at Davis, http://csrc.nist.gov/CryptoToolkit/modes/proposedmodes/xcbc-mac/xcbc-mac-spec.pdf, 3 pages.
Wu, D.M., Doney, R., "A Universal Self-Test Design for Chip, Card and System," Proceedings 1992 IEEE International Workshop on Defect and Fault Tolerance in VLSI Systems (Cat. No. 92TH0481-2) pp. 305-314 ISBN: 0 8186 2837 5.
Yang, et al., "CD-Rom Versus Web-Access to External Databases-Experiences and Insights," Rider University Libraries, pp. 193-200.
U.S. Appl. No. 60/717,347, "Hardware Driver Integrity Check of Memory Card Controller Firmware," filed Sep. 14, 2005, Holtzman, et al.
Akagi, A., "SD Format Verification," Matsushita Technical Journal Apr. 2002 vol. 49, No. 2 pp. 11-14 ISSN: 1343-9529.
Allard, J.J., "Dynamic Memory Array Card Burn In and High Speed Functional Card Testing," 1981 International Test Conference, Testing in the 1980's pp. 244-248.
Barsness, A.R. et al.,"ECC Memory Card with Built In Diagnostic Aids and Multiple Usage," IBM Technical Disclosure Bulletin, Apr. 1982 vol. 24, No. 11B pp. 6173-6174.
Communication Relating to the Results of the Partial International Search for International Application No. PCT/US2006/026241 mailed Dec. 18, 2006, 3 pages.
Dialog Search, Oct. 6, 2004 (15 pages).
Dialog Search, Oct. 3, 2005 (31 pages).
Discretix Technologies Ltd. "Secure Flash™ System Specification", Version 1.05, Jul. 15, 2004, Netanya, Israel (36 pages).
Engelbrecht, R., et al., ByMedCard-An Electronic Patient Record with Chip Card Functionality, Health Cards '97 Fourth International Congress pp. 313-317.
Gemplus, Employee Smart Badge, One Integrated And Secure Smart Badge To Manage All Access, 2 pages.
Guibert, H.; Gamache, A., Optical Memory Card Applicability for Implementing a Portable Medical Record, Medical Informatics Jul.-Sep. 1993 vol. 18, No. 3 pp. 271-278 ISSN: 0307-7640.
Haller, et al., "A One-Time Password System," IETF Standard-Working-Draft, Internet Engineering Task Force, IETF, No. 1, Mar. 24, 1997, XP015024796, pp. 1-8.
Hoornaert, "Vasco Data Security Enables Secure Communications Over the Internet," IS Audit & Control Journal, vol. IV, 1999, 3 pages.
Identification Cards—Contactless Integrated Circuit(s) Cards—Proximity Cards—Part 1: Physical Characteristics, ISO_IEC_14443-1_2000 PDF, 10 pages.
Identification Cards— Contactless Integrated Circuit(s) Cards—Proximity Cards—Part 2: Radio Frequency Power and Signal Interface, ISO_IEC_14443-2_2001_PDF, 18 pages.
iKey 1000, Workstation Security and Secure Remote Access, SafeNet, 2004, 2 pages.
iKey 2032, Personal USB Authentication and Encryption Token, SafeNet, 2005, 2 pages.
ISA/EPO, "Invitation to Pay Additional Fees", mailed on Jan. 26, 2007 in corresponding Int'l. App. No. PCT/US2006/035839, 2 pages.
ISA/EPO, "Invitation to Pay Additional Fees", mailed onDec. 18, 2006 in corresponding Int'l. App. No. PCT/US2006/026241, 7 pages.
ISA/EPO, "Notification of Transmittal of the International Search Report and the Written Opinion of the International Searching Authority, or the Declaration," mailed on Feb. 8, 2007 in corresponding Int'l. App. No. PCT/US2006/026241, 9 pages.
ISA/EPO, "Notification of Transmittal of the International Search Report and the Written Opinion of the International Searching Authority, or the Declaration," mailed on Mar. 29, 2007 in corresponding Int'l. App. No. PCT/US2006/035840, 6 pages.
ISA/EPO, "Notification of Transmittal of the International Search Report and the Written Opinion of the International Searching Authority, or the Declaration," mailed on May 25, 2007 in corresponding Int'l. App. No. PCT/US2006/035839, 9 pages.
ISA/EPO, "Written Opinion of the International Searching Authority," mailed on Feb. 8, 2007 in corresponding Int'l. App. No. PCT/US2006/026241, 15 pages.

ISA/EPO, "Written Opinion of the International Searching Authority," mailed on Mar. 29, 2007 in corresponding Int'l. App. No. PCT/US2006/035840, 8 pages.

ISA/EPO, "Written Opinion of the International Searching Authority," mailed on Sep. 13, 2006 in corresponding Int'l. App. No. PCT/US2006/035839, 12 pages.

Johnson, D., "Bus Emulation Drives Production Testing," Test & Measurement World Feb. 1995 vol. 15, No. 2 pp. 41-42, 44, 46, 48 ISSN: 0744-1657.

Lee, et al., "Modified Token-Update Scheme for Site Authentication, School of Computer Science and Engineering," Inha University, Incheon, 402-751, Korea, 6 pages.

Nystrom RSA Security M: "The Protected One-Time Password Protocol (EAP-POTP)," IETF Standard-Working-Draft, Internet Engineering Task Force, IETF, CH No. 2, Jun. 30, 2005, XP015040287.

O.J. Horak, "Means and Measures for Data Security," Armed Forces Data Processing Agency, Stifgasse 2a, A-1070 Wien, Austria, IFAC SAFECOMP '89, Vienna, Austria, 1989, 9 pages.

Open Specifications Integrate One-Time Passwords with Enterprise Applications, RSA Security, Feb. 2005, 10 pages.

Orlowski, Andrew, "Everything You Ever Wanted to Know About CPRM, But ZDNet Wouldn't Tell You . . . ," The Register.co.UK, Jan. 10, 2001, 6 pages.

Pinkas, Benny, "Efficient State Updates for Key Management," STAR Lab, Intertrust Technologies, Princeton; NJ, DRM 2001, LNCS 2320 pp. 40-56, 2002.

Renesas, X-Mobile Card, Digital Rights Management, Authentication and Secure Storage for Mobile Devices, Providing Remote Access and Secure Storage Solutions for IT, Advanced Solutions Group, 2005, 4 pages.

RSA Security Inc.: "A CryptoAPI Profile for One-Time Password Tokens V1.0 Draft 2" One-Time Password Specifications (OTPS), Jun. 27, 2005, XP002416270.

RSA Security Inc.: "OTP-WSS-Token: Web Services Security One-Time-Password (OTP) Token Profile, Version 1-0d3", One-Time Password Specifications (OTPS), Jul. 6, 2005, XP002416269.

RSA Security Inc.: "PKCS#11 Mechanisms for One-Time Password Tokens V1.0 5th Draft", One-Time Password Specifications, Jun. 27, 2005, XP002415773.

RSA Security, "Federated Identity Management and Return on Investment," White Paper, 2004-2005, 12 pages.

RSA Security, "Federated Identity Manager, A Technical Overview," Technology Backgrounder, 2005, 16 pages.

RSA Specification, "Cryptographic Token Key Initialization Protocol, V1.0 Draft 3," RSA Security, Jun. 14, 2005, 29 pages.

Rubin, "Independent One-Time Passwords," USENIX Association, Proceedings of the Fifth USENIX UNIX Security Symposium, Jun. 5-7, 1995, 13 pages.

Rubin, "Independent One-Time Passwords," USENIX, A Quarterly dedicated to the analysis and understanding of advanced computing systems, vol. 9, No. 1, Winter 1996, 15 pages.

SafeNet AXIS, "Strong Authentication and Single Sign-On," AXIS Instant Logical & Physical Access Security, 2005, 2 pages.

SanDisk Corporation "BE2 Architecture", Revision 1.1, Jun. 9, 2003 (21 pages).

SanDisk Corporation I, "CryptoFlash Integration in BE2", Revision 1.21, Oct. 19, 2004, (34 pages).

SanDisk Israel Discloser #SDK0570 "Flash Memory Card with In Stream data Encryption/Decryption", (4 pages).

Secure Business-to-Business Single Sign-On (B2B SSO) Based on Federated Identity Management, RSA Security, 2004-2005, 6 pages.

Seitz, et al., "Key Management for Encrypted Data Storage in Distributed Systems," Proceedings of the Second IEEE International Security in Storage Workshop (SISW'03), 11 pages.

ST Microelectronics: "Trusted Platform Module (TPM)"; May 2004; XP-002345888; 5 pages.

Tsuchida, S., "Test and Repair of Non-Volatile Commodity and Embedded Memories," Proceedings International Test Conference 2002 (Cat. No. 02CH37382) p. 1223 ISBN: 0 7803 7542 4.

U.S. Appl. No. 11/317,862, "Secure Memory Card with Life Cycle Phases", filed Dec. 22, 2005, Holtzman et al.

VeriSign, "Extending Managed PKI Services to Smart Cards for Greater Convenience and Security," 2001, 14 pages.

VeriSign, "Trusted Federated Identity Solution Architecture," 2004, 16 pages.

Weippl, Edgar, "An Approach to Role-Based Access Control for Digital Content," Software Competence Center Hagenberg Hauptstr. 99 A4232 Hagenberg, Austria, 2001, 5 pages.

Co-pending U.S. Appl. No. 12/122,412, filed May 16, 2008.

Office Action Issued in U.S. Appl. No. 12/122,412, mailed Oct. 21, 2010, 14 pages.

Office Action issued in Japanese patent application No. 2008-531323, mailed on Jan. 25, 2011 (15 pages, including translation).

* cited by examiner

METHODS USED IN A SECURE YET FLEXIBLE SYSTEM ARCHITECTURE FOR SECURE DEVICES WITH FLASH MASS STORAGE MEMORY

CROSS REFERENCE TO RELATED APPLICATIONS

This application claims priority to provisional Application No. 60/717,164 entitled "Secure Yet Flexible System Architecture for Secure Devices With Flash Mass Storage Memory" filed Sep. 14, 2005 to Micky Holtzman et al.

This application is related to the following applications, each of which is hereby incorporated by this reference in its entirety: "Secure Yet Flexible System Architecture for Secure Devices With Flash Mass Storage Memory" to Micky Holtzman et al., "Method of Hardware Driver Integrity Check Of Memory Card Controller Firmware" to Micky Holtzman et al., application Ser. No. 11/284,623, "Hardware Driver Integrity Check Of Memory Card Controller Firmware" to Micky Holtzman et al., application Ser. No. 11/285,600, "Methods Used in a Secure Memory Card With Life Cycle Phases" to Micky Holtzman, et al. and "Secure Memory Card With Life Cycle Phases" to Micky Holtzman et al.

FIELD OF THE INVENTION

The present application is generally related to the operation of flash based mass storage devices, and in particular those with copy protection of secure content.

BACKGROUND OF THE INVENTION

Flash based mass storage devices are used to store very large amounts of content, such as pictures and music or software programs. Examples of these mass storage devices include memory cards, universal serial bus ("USB") flash drives, flash based music and/or video players, and other portable computing devices that rely on flash for the mass storage of content or files.

User files are frequently updated and modified. This is particularly the case when dealing with photos, music, and documents. Flash memory has a limited number of read/write cycles, and a great deal of research and development has gone into distributing the cycles among the flash memory cells in order to maximize the lifespan and reliability of the devices. For instance, wear leveling techniques such as those taught in U.S. Pat. No. 6,230,233 entitled "Wear Leveling Techniques For Flash EEPROM Systems" to Lofgren et al., U.S. Pat. No. 5,268,870 entitled "Flash EEPROM System and Intelligent Programming and Erasing Methods Therefore" to Harari, PCT Publication No. WO2004040578A2 entitled "Wear Leveling In Non-Volatile Storage Systems" to Chang et al., and U.S. Patent Publication No. 20040083335A1, entitled "Automated Wear Leveling In Non-Volatile Storage Systems" to Gonzalez et al., which are hereby incorporated by this reference in their entireties, are commonly implemented in these devices. These techniques generally involve changing the logical/physical mapping so that physical locations of the memory are used roughly the same amount.

In addition, as the usage of flash based mass storage devices is proliferating, the number of different things that can be done with them is also increasing.

Therefore, there exists a need for a new device operating system architecture that provides flexibility to store and run a wide range of firmware that can be updated and changed to accommodate the range of increasing functionality. In addition to being flexible, this architecture must provide a highly secure and reliable environment for both firmware and content. As is always the case, all of this should be done for the lowest possible cost, using standard components whenever possible.

SUMMARY OF INVENTION

The present invention allows a device to be both secure in operation and flexible in terms of functionality. This means functionality can be tailored to users' desires and added over time all the while maintaining a high level of security. Therefore the device can be used to store confidential and limited access information such as transactional data and copyrighted artistic works.

The present invention also allows for the device to boot quickly and reliably while still providing for reliable long term data storage through the use of wear leveling techniques where appropriate.

Firmware that is not authentic, and that may potentially compromise the security of the device will not be executed. An indication of the authenticity is verified before execution. In a preferred embodiment, multiple different levels of such indications are provided and are associated with the particular controller of the device that created the indications. In this preferred embodiment, one or more of the different levels of indications can be verified. Without the properly associated indication the firmware will not be executed.

Another aspect of the present invention is that this security is achieved despite the fact that the device utilizes readily available memory without built in security for the mass storage of the data, including the firmware.

DETAILED DESCRIPTION OF THE PREFERRED EMBODIMENTS

Devices incorporating flash memory for mass storage purposes must store large amounts of content that is written and read relatively often. For instance, digital photo and music libraries are regularly updated by users of such devices. With the increase of protected content and the desire to protect content generally, such devices must also provide robust security to prevent unauthorized copying of such "secure" or protected content. At the same time, security should not come at the cost of flexibility. The present invention provides for a device that allows functionality to be added over time, while maintaining a high level of security. This flexibility is essential in a world where devices are expected to provide ever increasing functionality.

A secure device is one that protects the contents of the device from unauthorized copying or alteration. Secure content includes any content or data that it is desirable to safeguard from unauthorized copying or tampering. In addition to billing, transaction and other traditionally confidential personal information, artistic content must also be secured from access and copying by those other than the owner or other authorized persons.

Depending on the architecture of the device, a hacker may try to gain access to the content via data buses, or by directly accessing the mass storage memory. In some prior devices, directly accessing the memory storage unit was difficult as the memory storage unit was often protected by placing it an environment that was logistically hard to access. For instance, Smart Cards utilized programmable read only memories (PROMS) that incorporated a small amount of non volatile memory that was made secure in part by physically isolating it from access.

However, it is desirable to utilize unsecure mass storage memory, that is, among other things, more standardized, readily available, and/or economical. An unsecure memory or storage unit is one where authorization is not required in order to gain (read/write) access to the (encrypted or unencrypted) data stored therein, or one where there are no built in protection mechanisms that prevent copying of the stored data. While this memory may be packaged in a multi functional package with other non-memory components such as a processor, it is commonly in the form of a dedicated memory package with one or more memory chips.

Typically, a device or system incorporating mass storage flash memory utilizes a processor to control the data storage and retrieval operations of the memory. Such a processor is part of a controller and is often referred to as a controller. A controller executes software instructions to control the device. The software that runs and controls the hardware of a device is often referred to as firmware. The firmware is typically executed from random access memory (RAM) after having been copied from some other memory where it is normally stored. Shadowing or copying to RAM is advantageous because although flash is easily updated it is slower and not inherently executable because it does not have random access capability, and because read only memory is not easily updated.

In the case where some amount of security is to be provided in the firmware, there must be some mechanism to prevent execution of the other than the proper firmware that has the requisite security mechanisms. This is especially true when the firmware is stored in an unsecure memory. As mentioned above, it is the firmware that controls the operation of the device, and therefore it is not a simple matter to have the firmware essentially protect itself. Nor is it a simple matter to protect execution of compromised or unauthentic firmware when such firmware is stored in an otherwise unsecure memory package.

The present invention provides for a secure system with mass storage capability even though it uses unsecure memory for the mass storage unit. Furthermore, it creates a secure system where the firmware for running the secure system is stored in the unsecure memory. In order to be able to store the firmware in the unsecure mass storage memory, the present invention employs a system that prevents execution of inauthentic firmware.

Figure 1A:
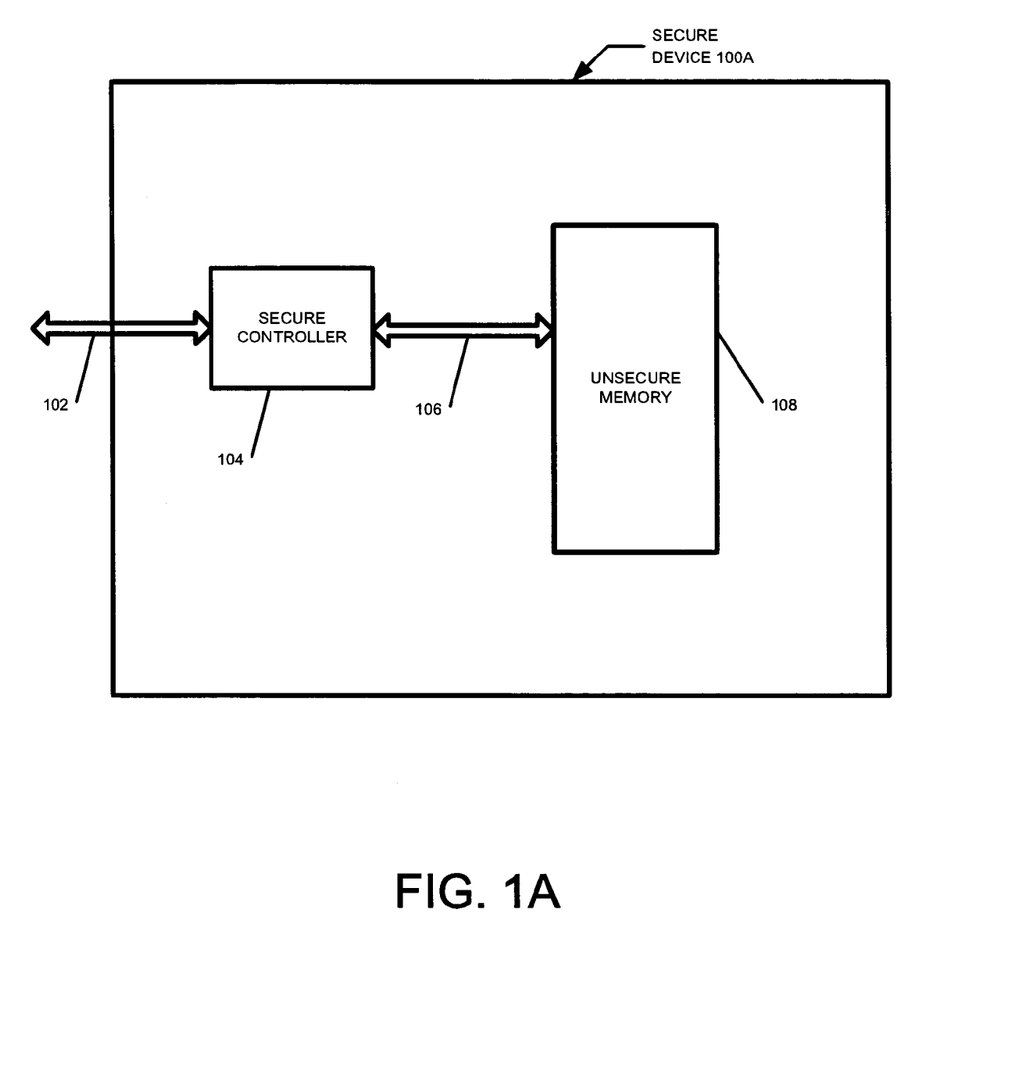
FIG. 1A is a schematic diagram of secure device 100A, an embodiment of the present invention.

Reference will now be made to preferred embodiments depicted in the figures. FIG. 1A illustrates secure device ("SD") 100A, an embodiment of the present invention. SD 100A comprises a secure controller 104 and unsecure memory 108.

Memory 108 is preferably flash type memory and is used for mass storage purposes. This means that the memory is used for general purpose storage of user files, such as audio, video, and picture files, among other things. It is a principal memory storage unit of device 108 and can be used to store any type of file a user wishes to store in it. It is designed to allow a user to frequently update and access his library of files. A mass storage memory is generally larger than other random access memory ("RAM") and read only memory ("ROM") that SD 100A may also comprise (not shown) in this and other embodiments. Also, as a general file storage device, a mass storage memory is distinct from code storage devices that are designed to store comparatively small amounts of operating code that are infrequently updated. A ROM or flash memory may be used as a code storage device, but it should be understood that a code storage device is different in purpose and generally in size than a mass storage device.

SD 100A also comprises a data or memory bus 106 and a host bus 102. SD 100A may be a complete electronic device such as a digital camera or music player, cellular telephone etc. It may also have the form factor of a memory card or universal serial bus ("USB") drive designed to be used in conjunction with any type of processor controlled electronic device. For simplicity in describing SD 100A and the other embodiments depicted in the figures, the embodiments may often be referred to as a memory card, but it should be understood that such reference is to a preferred embodiment and should not limit the scope of the present invention which is defined by the appended claims. Currently, the preferred form factor for a memory card in which the present invention is especially useful is the well known Secure Digital ("SD") Card.

Data and commands are communicated to and from SD 100A via host bus 102. The host, which is not shown, may be a personal computer or other electronic device. Secure controller 104 controls the read and write operations to and from unsecure memory 108 via memory bus 106. In doing so, it also limits access to the contents of the unsecure memory 108. As mentioned above, the firmware that runs the device is stored in unsecure memory 108. This firmware, which will be described in more detail later with regard to FIGS. 2-7, in conjunction with controller 104, provides the security that makes device 100A a secure device. Therefore, it is essential that the firmware that is executed by secure controller 104 is authentic, or the security of the system could be compromised.

Ensuring the authenticity of the firmware is much more difficult when it is in an unsecure memory. However, given that the unsecure memory 108 is used for mass storage purposes, it is quite large and is easily updated. Therefore, it makes sense to use the capacity of the unsecure memory to store the firmware. This may eliminate or a least reduce the size of a code storage device dedicated to storing the firmware. Alternatively it reduces the need for such storage within the controller. This cost saving is important in a competitive market. There are 3 main paths to the contents stored in memory 108: reading the contents of the memory 108 directly; monitoring the signals on bus 102; and monitoring the signals on bus 106. Even though any or all of the information in the unsecure memory 108 or on buses 102 and 106 may be in an encrypted format, there is always the danger that the encryption key(s) could be compromised. If the firmware were to be compromised and replaced with another firmware that lacked the security features of the authentic firmware, and then executed by the system, restricted or limited access files and private data on the mass storage memory could be copied or tampered with. For example, a user's banking or social security information could be copied or altered without authorization, with obvious negative ramifications. In another example, copyrighted or otherwise protected content could also be copied without authorization. Digital rights management schemes could be thwarted. As another example, cryptographic codes or user passwords could also be compromised.

Figure 1B:
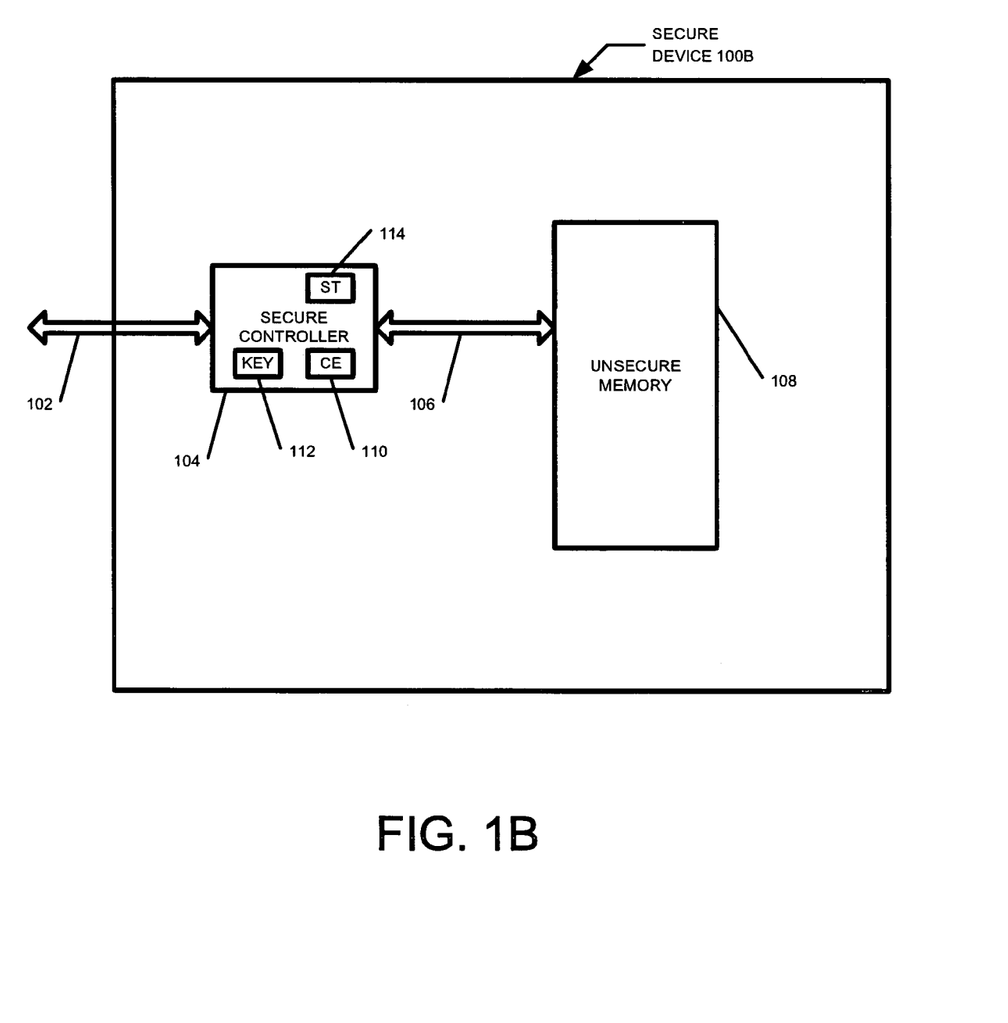
FIG. 1B is a schematic diagram of secure device 100B, an embodiment of the present invention.

FIG. 1B illustrates secure device 100B. Secure controller 104 comprises cryptographic engine 110, one or more encryption keys 112 stored in a non volatile memory of controller 104, and an indication 114 of the device operating state that is also stored in a non volatile memory of controller 104. In certain embodiments of the invention, numerous states or life cycle phases are entered and passed through during the life of the card. Depending on the phase, logic in the card enables or disables the encryption engine, controls access to hardware (before and after card assembly) and software testing mechanisms, and controls key generation. These phases not only allow both the hardware and software of the card to be thoroughly tested before and after manufacture, but also make it virtually impossible to access the encrypted keys and thus the encrypted content when the card is in a secure phase, the operating phase that the card is in when it is shipped to the user. For more information on the states or life cycle phases please refer to an application having "Secure Memory Card With Life Cycle Phases" to Micky Holtzman et al., which is hereby incorporated by this reference in its entirety.

The cryptographic engine 110 is hardware based and can encrypt and/or decrypt data as it passes through secure controller 104. For example, data encrypted with a first encryption algorithm as it arrives at the controller from host bus 102 can be decrypted and then encrypted with a second algorithm before it is sent to flash memory 108 via data bus 106. Of course, data encrypted in memory 108 can be decrypted by engine 110 and passed in a decrypted state over host bus 102 although it is preferably in an encrypted format as it passes over host bust 102 so as to avoid potential unauthorized copying of the data.

The cryptographic engine 110, also referred to as encryption engine 110, may comprise numerous sub engines and is capable of utilizing numerous encryption standards and algorithms. Examples of the various encryption techniques and algorithms include: Message Authentication Codes ("MACs"); Data Encryption Standard ("DES"), Triple DES, Advanced Encryption Standard ("AES"), RSA and Diffie-Helman that are often used in a Public Key Infrastructure ("PKI"), and other hash based encryption such as SHA-1 and MD5. The encryption engine may use other currently available algorithms and techniques and others yet to be developed or well accepted, and the aforementioned list is only meant to provide some examples.

A Message Authentication Code is a hash computed from a message and some secret data. It is difficult to forge without knowing the secret data. The MAC is computed using an algorithm based on the DES or AES ciphers, which use a secret key. The secret key 112, or one or more keys derived from the secret key are stored in controller 104, and therefore the hash or message authentication code created by the controller is associated with that controller, and cannot be duplicated by another controller. Therefore hash values from a particular controller are associated with the controller and can act as a type of signature of the controller and device, because the signature is unique and cannot be duplicated.

Although the aforementioned standards and various other algorithms and/or standards are well known to those skilled in cryptography, the following publications are informative and are hereby incorporated by reference in their entireties: *RFC 3566 —The AES-XCBC-MAC-96 Algorithm and Its Use With IPsec* by Sheila Frankel, NIST—National Institute of Standards and Technology, 820 West Diamond Ave, Room 677, Gaithersburg, Md. 20899, available at http://www.faqs.org/rfcs/rfc3566.html; *Performance Comparison of Message Authentication Code (MAC) Algorithms for the Internet Protocol Security (IPSEC)* by Janaka Deepakumara, Howard M. Heys and R. Venkatesan, Electrical and Computer Engineering, Memorial University of Newfoundland, St. John's, NL, Canada, A1B3S7 available at http://www.engr.mun.ca/~howard/PAPERS/necec_2003b.pdf; and *Comments to NIST concerning AES Modes of Operations: A Suggestion for Handling Arbitrary-Length Messages with the CBC MAC* by John Black, University of Nevada, Reno, Phillip Rogaway, University of California at Davis, available at http://csrc.nist.gov/CryptoToolkit/modes/proposedmodes/xcbc-mac/xcbc-mac-spec.pdf.

Figure 2:
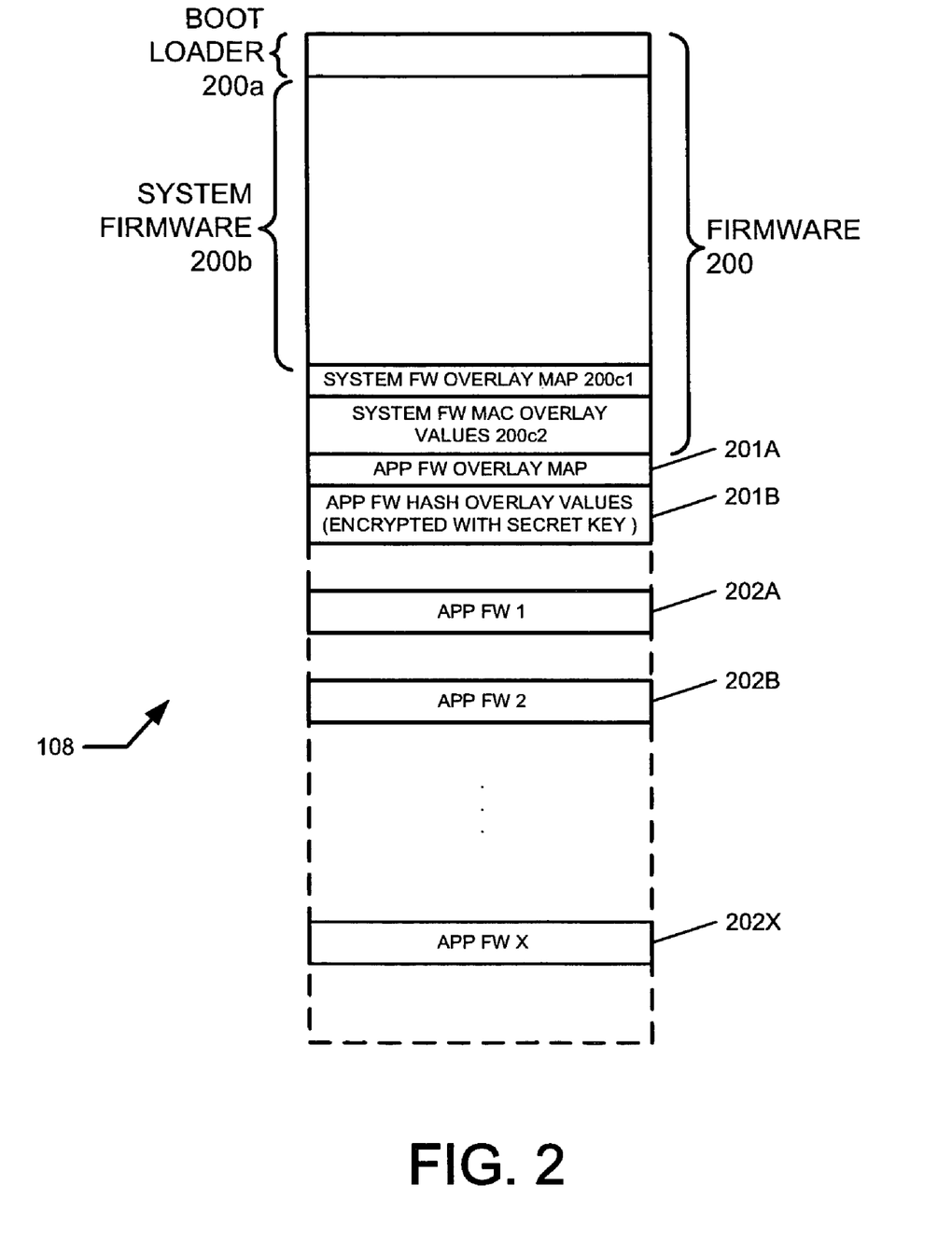
FIG. 2 is a diagram illustrating various pieces of firmware in a portion of memory space 108.

FIG. 2 is an illustration of the memory space of the flash memory 108 that includes firmware 200 that runs devices 100A or 100B. The system firmware 200 comprises a boot loader (BLR) portion 200a that resides in flash memory 108 and is preferably not changeable, and system firmware 200b that resides in flash memory 108 and can be changed from time to time if necessary. The size of system firmware 200 is larger than the RAM module it is executed from, so the system firmware is divided into smaller portions referred to as overlays. Each overlay preferably has its own hash value and within system firmware 200 is a table 200c of those hash values. Table 200c is not loaded as part of system firmware 200b, but the pre-stored values are compared with calculated values as will be discussed in more detail below. Any hash value can be used, but MAC or SHA-1 values are currently preferable. Generally, SHA-1 digests may alternatively be used in place of MAC values, and vice versa. The advantage of using MAC values is that they are associated with the hardware and the key of the hardware that created them. While SHA-1 values can be created for a given data set simply based upon the data itself, MAC values cannot be recreated without the key, and thus provide for more robust security. Specifically, because key 104 (or a key derived therefrom) stored in the non volatile memory of encryption engine 110 must be used to create the MAC values, another processor cannot be utilized to recreate the MAC values. For example, a hacker cannot use another processor outside of the system to duplicate the firmware and the associated MAC values.

As a further security precaution, the hash values themselves can be encrypted one or more times. In the example of MAC values, a MAC entry that protects the MAC table 200c2 is created so even if a hacker finds a way to switch or alter the firmware and recalculate the appropriate MACs, he is still facing a problem because he must calculate the MAC of MACs (or MAC of SHA-1s). Furthermore, in one embodiment the MAC of MACs is again encrypted and stored in another (different) memory field, for example the non volatile memory of encryption engine 110 or the controller 104. This multi-level distributed hierarchy ensures that the signatures cannot be forged, or rather, that a forged signature will not be accepted as authentic. As an illustration, if one were to access the flash memory 108 and replace the firmware and table 200c, the system would then check one level up the hierarchy and see if the MAC of table 200c indicates that table 200c has not been tampered with. If the stored MAC of the table does not match the calculated MAC, this indicates a problem with the authenticity. However, if the MAC of table 200c has also been altered to match the replaced table 200c, then the system would verify the signature in error. This error is avoided by storing a copy of the MAC of table 200C in another (inaccessible) memory, and comparing the copy in the other (inaccessible) memory with the value in the flash memory 108. If the values do not match, this indicates an authenticity problem. Although only a few levels were illustrated, this multi-level distributed structure may have numerous levels and incorporate numerous different memories depending on the size and complexity of the firmware to be protected.

This multi-level distributed hierarchy employed in conjunction with the overlay structure of the firmware also results in a very efficient and rapid authentication process. Dividing the firmware into overlays and signing each overlay greatly speeds up the overall authentication process. This is because it is much faster to verify the signature of a smaller amount of code. In order to calculate a hash value, all of the data for which the hash is to be calculated must be read. The larger the portion of firmware to be read, the longer it will take to calculate the signature, and then verify that the signature is authentic. Calculating the signature for a large amount of data is potentially very time consuming and inefficient.

Also stored within the flash memory are various firmware applications 202A . . . X, shown as APP FW 1, 2 . . . X, and, of course, user files (not shown). The firmware applications may be configured differently for various product configurations. The number and type of these applications will vary from one product to another. The firmware applications are also preferably divided into overlays if the applications are larger than the RAM module. A map of the application firmware overlays 201A indicates the location in memory of the various overlays. A table of hash values (SHA-1 digests or MAC values etc. . . . ) 201B for the various firmware applications, encrypted with a secret key, which may be secret key 104 or a key derived from secret key 104, is also stored in the flash memory. A firmware application is akin to other applications that run on a base system, e.g. a word processing application in the Windows® environment running on the Windows® operating system.

As discussed in the background, flash memory cells have a limited lifetime and the cells degrade with each read and write operation. Therefore data in the flash memory is generally moved from time to time in order to distribute the read and write operations evenly among the cells and distribute the "wear" evenly amongst the cells. This wear leveling, along with all read/write operations, is controlled by the firmware 200, and in particular by the system firmware 200B. In order to be able to easily move data, the data is logically stored. This means that a logical address is mapped to a physical address, and that while the logical address remains the same, it can be mapped to a different physical address. Again, this logical to physical mapping is carried out by the system firmware.

It presents some difficulty if the firmware is in charge of moving itself. This is especially true when the firmware is responsible for copy protection of the data in the flash memory, and should therefore preferably be verified as authentic before execution. Also, while it is true that the system firmware may be updated from time to time, it will be written very infrequently when compared with other data stored in the flash memory 108. Therefore, the firmware 200, including the boot loader 200a is physically (without logical mapping) written to and read from flash memory 108.

The application firmware provides additional functionality not present in the system firmware, and may be loaded into the device at any time. It is unknown how much application firmware may be loaded into the device, and when each application may be loaded. Therefore space within the physical partition is not allocated and the application firmware is stored in the logical partition 214 and logically addressed like any other user files and data in the flash memory 108.

Figure 3:
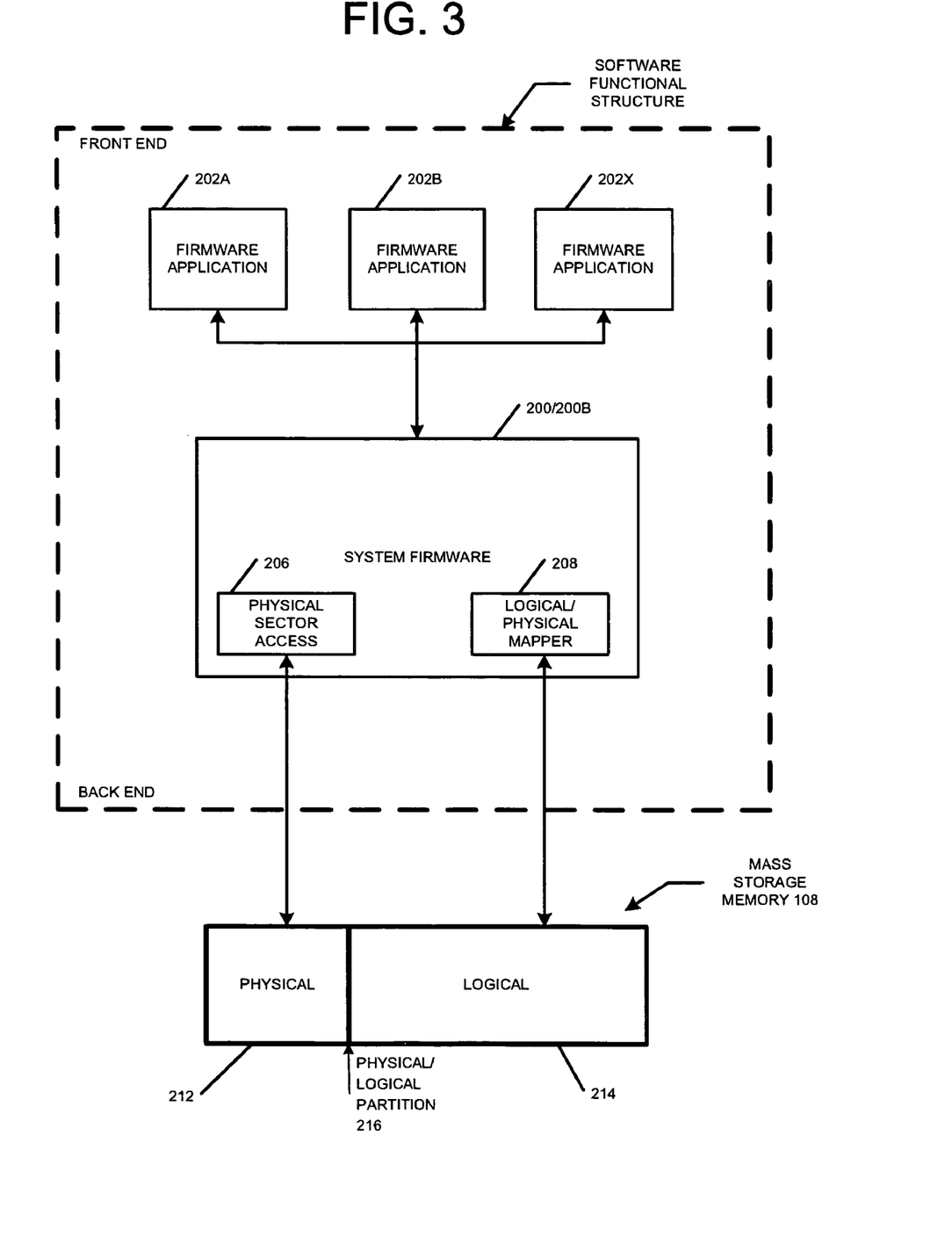
FIG. 3 is a schematic diagram illustrating software structure and hardware access according an embodiment of the present invention.
Figure 4:
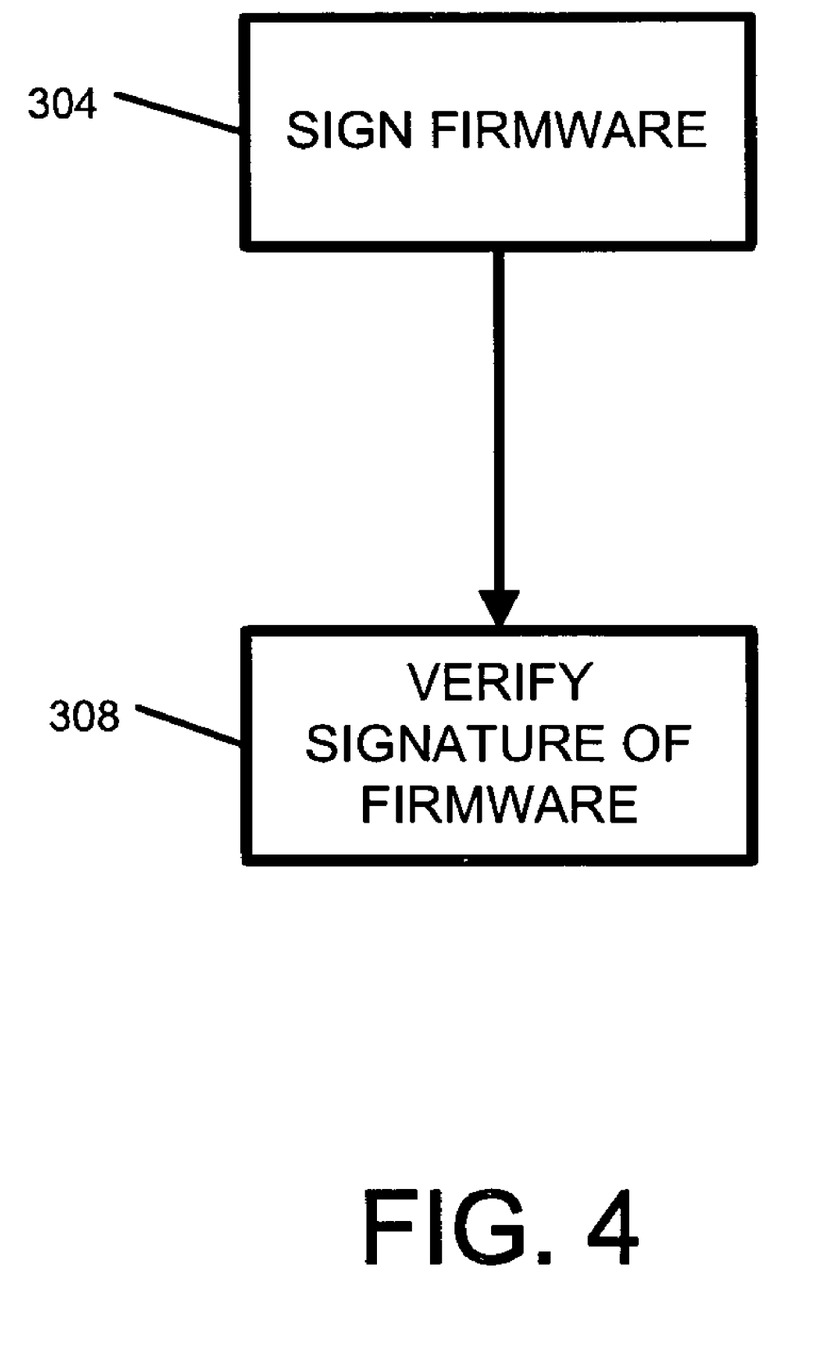
FIG. 4 is a flowchart illustrating some steps of firmware integrity verification.

FIG. 3 illustrates the functional structure of the software of the device and how it accesses the mass storage memory 108. As mentioned before, the preferred embodiments comprise flash type memory for mass storage memory 108 and for simplicity, during this description of the preferred embodiments the terms may be used interchangeably. The portion of the software that is concerned with flash memory operations is referred to generally as the back end, while the portion of the software that involves the applications and the user interface is known as the front end. Firmware applications 202A, 202B . . . 202X run on top of firmware 200 which includes system firmware 200B. Although the BLR 200a is a separate component of firmware 200, the BLR bootstraps the system firmware and may in essence generally be thought of as part of system firmware 200. The system firmware 200 has physical sector address routines or block 206 and logical/physical mapper or mapping routines 208. The mass storage memory 108 is partitioned into physical storage area 212 and logical storage area 214. Physical/logical partition 216 is used to illustrate the division or partitioning of the mass storage memory 108 into areas 212 and 214. Each of areas 212 and 216 can be further partitioned into smaller areas, and it is common in the art to use the term partitions to refer to these smaller areas also. The physical sector access routines or functional block 206 controls reading and writing in the physical area or partition 212, and the logical/physical mapper block controls reading and writing in the logical storage area 214.

Firmware 200, including system firmware 200B, is stored in physical area 212. Application firmware 202A . . . X is stored in logical area 214 where the user files are also stored. The application firmware and all other data in logical area 214 is moved around from time to time by the wear leveling routines of the system firmware.

The authenticity of all of the firmware is preferably checked before it is executed. This is done because, as discussed earlier, the mass storage memory 108 does not have its own built in protection mechanisms. The flowchart of FIG. 4 applies to any piece of firmware, including application firmware. In step 304, the firmware is signed. This is typically done at the time of loading of the firmware, but a signed record can be updated by overwriting the record with a new one. The signature comprises one or more hash values of at least a portion of the firmware. The hash values are preferably of the MAC variety, because, as discussed earlier, a MAC value is created with a key used with and/or stored within the controller that created the MAC value, and cannot be recreated by another processor. Each portion or piece of firmware may be signed using a different key. For example, BLR 200A may be signed with a first key, while system firmware 200B is signed with a second key. Various portions (e.g. overlays) of firmware 200 can also be signed with various different keys. As another example, each piece of application firmware 202A . . . X can be signed with a different key.

Hash values for BLR 200A are stored and calculated in a unique process that is described in copending application entitled "Hardware Driver Integrity Check Of Memory Card Controller Firmware" to Micky Holtzman et al. Please refer to that application for further information on that process.

In one preferred embodiment involving the aforementioned life cycle phases or states, the firmware can only be signed in certain states, and unsigned firmware cannot be executed. In particular, in state 150 (not shown), which is the secure operating state that the device will generally be in while in the hands of the consumer, firmware update and signing will not be allowed. This prevents installation of substitute firmware that may not be authentic. The system in that embodiment only enables the encryption engine to sign the firmware in states other than the secure state. In other embodiments, updating of the firmware is allowed in the field (i.e. while in state 150) as long as the firmware is signed before it is loaded and that signature can be verified by the card. The source of the firmware can also be identified and verified, as well as verifying the signature of the firmware itself. The firmware should be supplied by a trusted entity before it is loaded, and in a preferred embodiment the trust is established using a public key infrastructure ("PKI") certificate. This certificate could be in addition to or alternatively in lieu of the hash based signature. For example, if trust is established (by the certificate in this illustrative embodiment) then the encryption engine would sign the firmware. As another added precaution, a secure connection can be established with the supplier of the firmware. The secure connection would be encrypted to protect the data passing between the device and the supplier. The secure connection would preferably be encrypted according to the aforementioned AES standard, but could employ any known encryption standard.

As mentioned previously, the system firmware is broken up into overlays of smaller size so that each overly can be loaded into RAM for execution. A map 200c1 of the various overlays is stored in the flash memory. Each overlay is individually signed. A table 200c2 of the signatures, which are preferably MAC values, is also stored in the flash memory as part of firmware 200. The system or device 200 allocates sufficient room in the RAM for complete table 200c2 to be loaded, and the entire table is loaded and resident in RAM during operation of the device.

Each firmware application 202A . . . X is also broken up into overlays, and each overlay is likewise signed. Currently, as with the system firmware, it is preferable to calculate key dependent hash (e.g. MAC) values to sign the firmware applications, although as mentioned previously, other hash values may be used. Table 201B contains the signatures for each application firmware overlay in map 201A. A one sector buffer is pre-allocated in the RAM as a workspace for the application firmware signatures.

Although it is preferable to sign each overlay of any of the firmware because this prevents replacement of a piece of firmware that may have critical decision making functionality, any amount of firmware can rely on one signature. For example, although not preferred, one signature could be used for all the firmware. Furthermore, the size of the overlays or portions to be signed may also vary. Referring again to FIG. 4, after the firmware is signed in step 304 as described above, each signature is verified in step 308. When each piece, e.g. each overlay, of the firmware is read from the flash memory, it passes through the encryption engine 110, and the hash value of the piece is created "on the fly" by the encryption engine. This calculated value is compared to the stored value, and if the values do not match there is a problem with the authenticity of the piece of the firmware. If there is a match, then the next level of the hierarchical structure described earlier with regard to FIG. 2 will preferably be checked. Preferably all the levels will be checked as will the copy stored in the additional memory. As mentioned previously, this distributed hierarchical structure assures that the firmware and signature are authentic.

Figure 5:
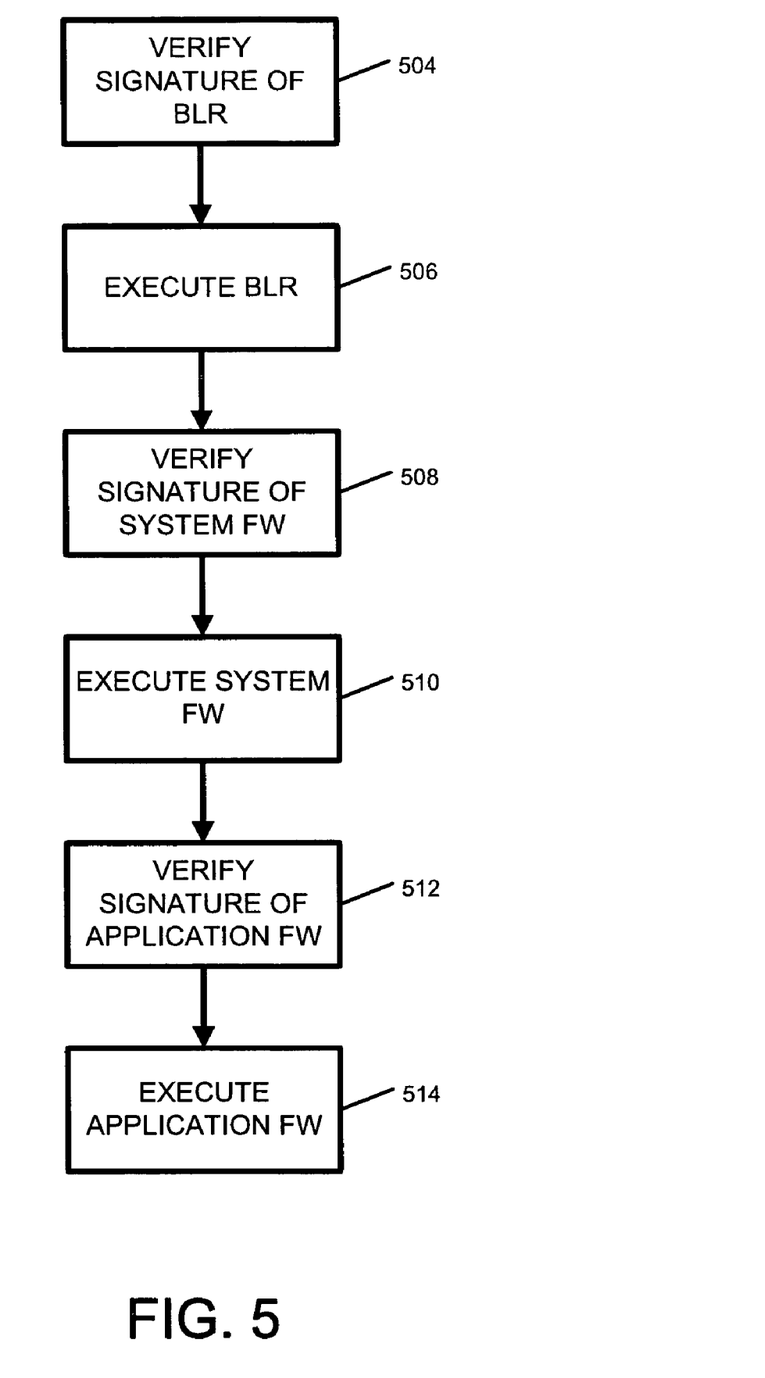
FIG. 5 is a flowchart of operation of an embodiment of the present invention.

FIG. 5 is a flowchart illustrating firmware execution. In step 504, the system verifies the signature of the boot loader portion ("BLR"). This can be done as mentioned above in regard to the system firmware, but is preferably done in another process described in a co-pending application entitled "Hardware Driver Integrity Check of Memory Card Controller Firmware" to Micky Holtzman et al. After the signature of the BLR has been verified it is executed in step 506. Next in step 508 the system verifies the signature of the system firmware. It then executes it in step 510. If any application firmware is present, its signature is verified in step 512 and then once verified it is executed in step 514. This is done for each piece of application firmware. As mentioned above, any of the verification steps 506, 508, and 510 are preferably done for each overlay of the entity being verified before or as it is loaded into the RAM.

Figure 6:
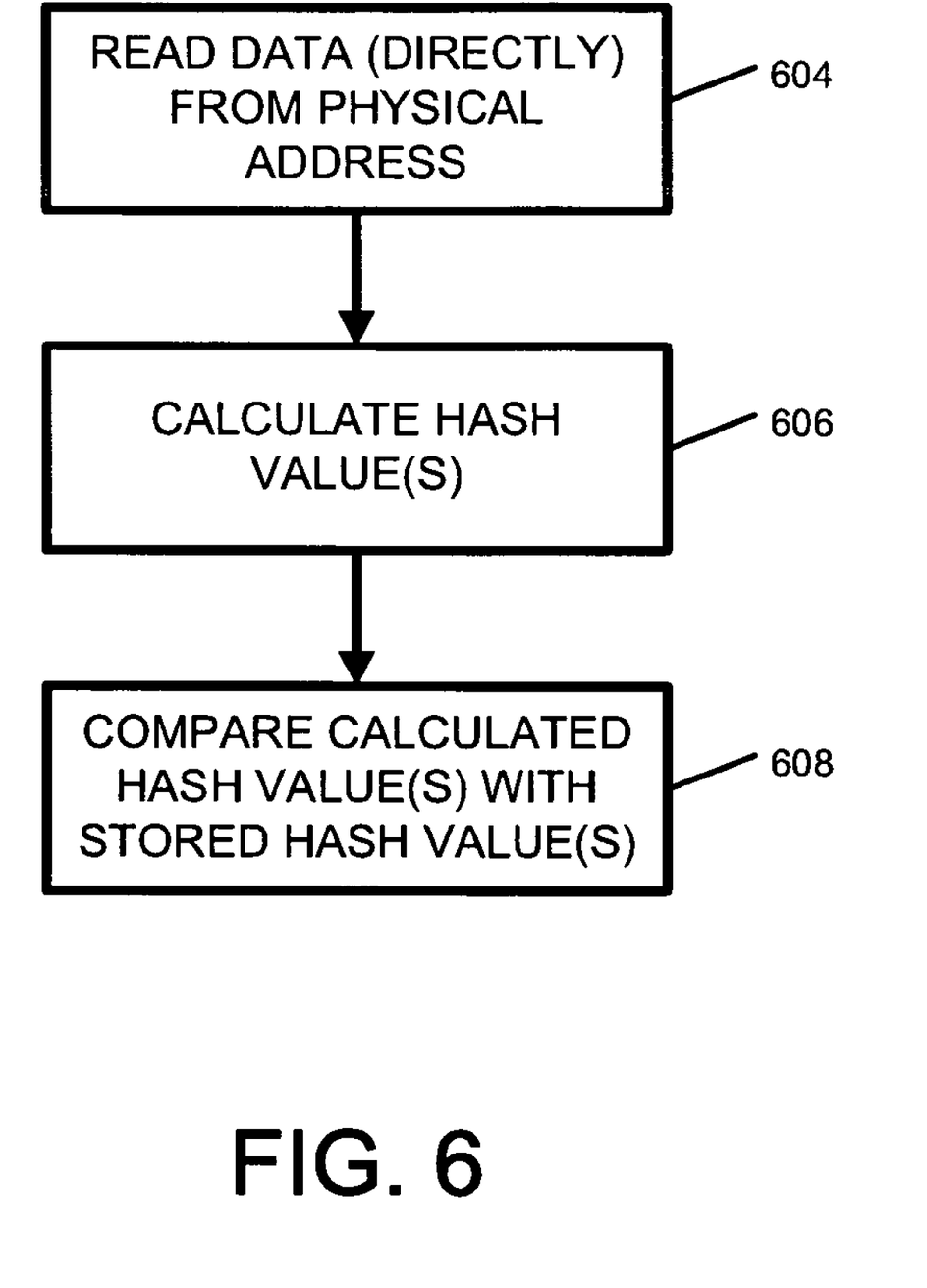
FIG. 6 is a flowchart illustrating integrity checking of physically stored data such as the firmware 200.

FIG. 6 is a flowchart illustrating the reading and verification of firmware 200, which is stored in the physical storage area 212. This corresponds to steps 504 and 508 of FIG. 5. In step 604 the data (firmware in this case) is read from the physical address where it is stored. Again, this physical read is performed without any logical mapping beforehand. Next, in step 604, hash value(s) are created for the firmware. These value(s) are temporarily stored in a register of the controller. Next in step 608 the value(s) calculated in step 606 are compared with the stored hash value(s). In the embodiments described, the stored value(s) are in tables in the flash memory, and may themselves be encrypted.

Figure 7:
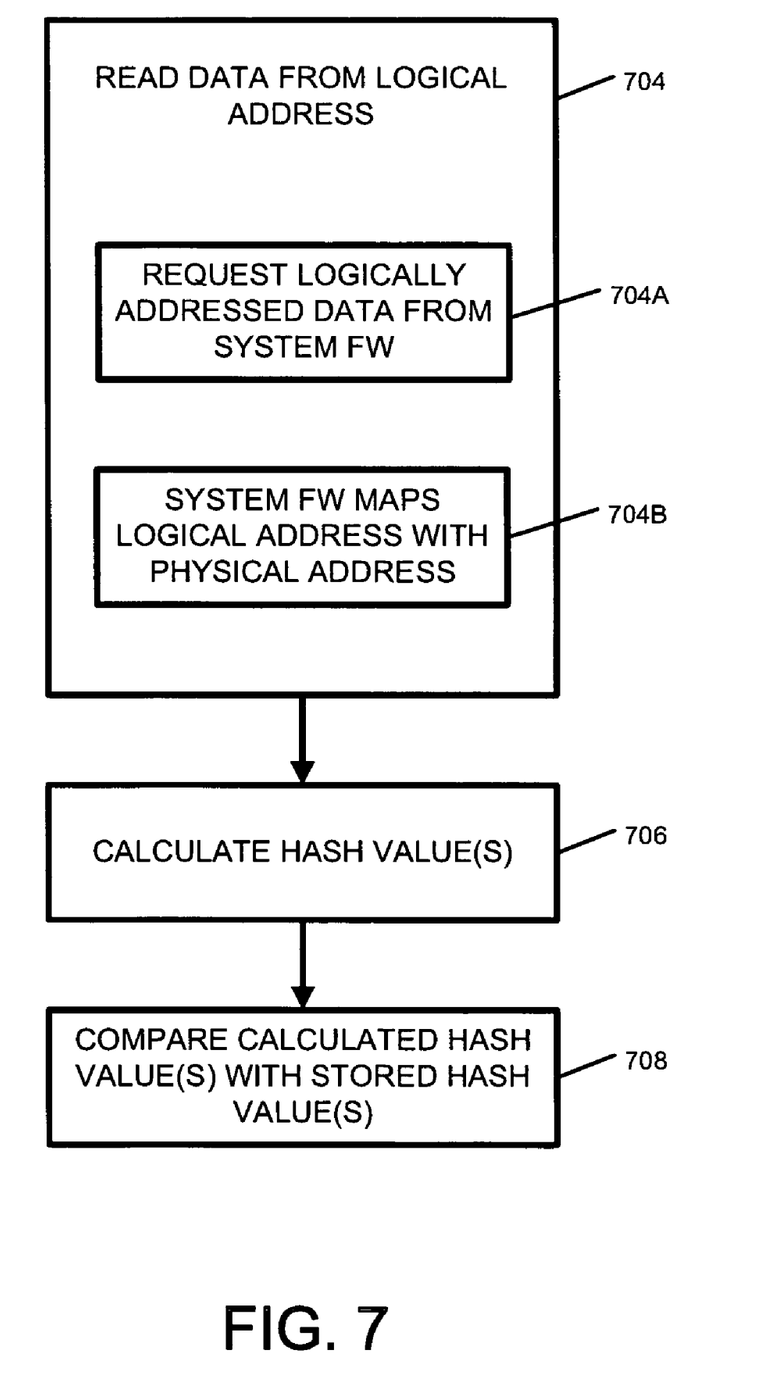
FIG. 7 is a flowchart illustrating integrity checking of logically stored data such as user files and the application firmware 202A, B, . . . X.

FIG. 7 is a flowchart illustrating the reading and verification of the firmware applications 202A . . . X. In step 704 the data is read from the logical address where it is stored. This comprises requesting logically addressed data from the system firmware in step 704A. It also comprises step 704B where the system firmware then maps the logical address with its corresponding physical address at that given time. After the data (firmware in this case) is read, hash values are calculated for the overlay or other quantity of firmware in step 706. Then in step 708 the calculated has value(s) are compared with the stored hash value(s). Again, in the embodiments described the stored hash values are in tables in the flash memory and may themselves be encrypted.

Although the various aspects of the present invention have been described with respect to exemplary embodiments thereof, it will be understood that the present invention is entitled to protection within the full scope of the appended claims.

It is claimed:

1. A method of operating a flash memory device comprising:

storing firmware in an unsecure mass storage memory in the flash memory device, the firmware comprising a first level and a second level, wherein the first level includes a boot loader that is stored in an exclusively physically addressed partition of the unsecure mass storage memory without logical mapping, and the second level is stored in a logical partition of the unsecure mass storage memory having logical mapping;

signing the firmware with a controller of the flash memory device while the firmware is being stored in the unsecure mass storage memory and storing a signature generated by the controller for the firmware in the unsecure mass storage memory;

reading the firmware stored in the unsecure mass storage memory and, prior to execution of the firmware, verifying authenticity of the firmware as it is read from the unsecure mass storage memory wherein the first level firmware is read without performing logical mapping and the second level firmware is moveable in the logical partition by a wear leveling routine; and wherein verifying authenticity comprises the controller of the flash memory device generating a signature for the firmware read from the unsecure mass storage memory and comparing the generated signature with the signature stored in the unsecure mass storage memory.

2. The method of claim 1, wherein signing the firmware comprises signing each of the first and second level firmware with a same signature.

3. The method of claim 1, wherein signing the firmware comprises signing the first level firmware with a first signature and signing the second level firmware with a signature different than the first signature.

4. The method of claim 3, wherein the second level firmware is divided into a plurality of overlays, each overlay comprising a different portion of the second level firmware, and wherein signing the firmware comprises signing each of the plurality of overlays of the second level firmware with a different key.

5. The method of claim 4, wherein a size of each of the plurality of overlays is less than a size of a volatile memory of the controller.

6. The method of claim 1, wherein the first level firmware comprises system firmware and the second level firmware comprises application firmware.

7. The method of claim 1, wherein signing the firmware and storing the signature comprises generating a hash value for the firmware and storing the hash value in a table in the unsecure mass storage memory.

8. The method of claim 6, wherein the system firmware comprises boot loader firmware.

9. The method of claim 7, wherein the hash value comprises one of a MAC value or an SHA-1 value.

10. The method of claim 7, further comprising encrypting the hash value prior to storing the hash value in the table.

11. The method of claim 6, wherein the steps of reading the firmware and verifying authenticity of the firmware as it is read comprises:
reading the system firmware from the physical partition of the unsecure mass storage memory;
verifying authenticity of the system firmware; and
if the system firmware is verified as authentic, subsequently reading the application firmware from the logical partition of the unsecure mass storage memory and verifying the authenticity of the application firmware.

12. The method of claim 11, further comprising controlling a logical to physical mapping of the application firmware in the unsecure mass storage memory with the system firmware.

13. A method of operating a flash memory device comprising:
storing firmware in an unsecure mass storage memory, the firmware comprising a first level and a second level, wherein the first level includes a boot loader that is stored in an exclusively physically addressed partition of the unsecure mass storage memory without logical mapping, and the second level is stored in a logical partition of the unsecure mass storage memory having logical mapping;
reading at least a portion of the first level firmware from the exclusively physically addressed partition of the unsecure mass storage memory of the flash memory device into a memory of a controller of the flash memory device wherein the first level firmware is read without performing logical mapping and the second level firmware is moveable in the logical partition by a wear leveling routine;
generating a hash value at the controller for the at least a portion of the first level firmware as the at least a portion of the first level firmware is read from the unsecure mass storage memory;
comparing the generated hash value with a stored hash value for the at least a portion of the first level firmware previously stored in the unsecure mass storage memory for the at least a portion of the first level firmware, wherein the stored hash value comprises a hash value generated by the controller when the controller previously stored the first level firmware; and
preventing execution of the first level firmware if the generated hash value does not match the stored hash value.

14. The method of claim 13, wherein the stored hash value comprises an encrypted stored hash value and wherein comparing the generated hash value with the stored hash value comprises reading the encrypted stored hash value from the unsecure mass storage memory and decrypting the encrypted stored hash value.

15. The method of claim 13, wherein generating the hash value comprises generating the hash value based on a controller-specific key stored in the controller.

16. The method of claim 13, wherein a generated hash value for a first portion of the first level firmware is generated with a first cryptographic key.

17. The method of claim 16, wherein a generated hash value for a second portion of the first level firmware is generated with a second cryptographic key.

18. The method of claim 13, further comprising:
executing the first level firmware if the generated hash value matches the stored hash value; and
after executing the first level of firmware:
reading at least a portion of the second level firmware from the unsecure mass storage memory area of the flash memory device into the memory associated with a controller of the flash memory device;
generating a hash value at the controller for the at least a portion of the second level firmware as the at least a portion of the second level firmware is read from the unsecure mass storage memory;
comparing the generated hash value with a stored hash value previously stored in the unsecure mass storage memory for the at least a portion of the second level firmware; and
preventing execution of the second level firmware if the generated hash value for the at least a portion of the second level firmware does not match the stored hash value for the at least a portion of the second level firmware.

19. A method of operating a flash memory device comprising:
storing firmware in an unsecure mass storage memory, the firmware comprising a first level and a second level, wherein the first level includes a boot loader that is stored in an exclusively physically addressed partition of the unsecure mass storage memory without logical mapping, and the second level is stored in a logical partition of the unsecure mass storage memory having logical mapping;
reading one portion of a plurality of portions of the first level firmware from the unsecure mass storage memory of the flash memory device into a memory of a controller of the flash memory device, wherein the first level firmware is read without performing logical mapping and the second level firmware is moveable in the logical partition by a wear leveling routine;
generating a hash value at the controller for the one portion of the plurality of portions of the first level firmware as the one portion of the plurality of portions of the first level firmware is read from the unsecure mass storage memory;

comparing the generated hash value with a stored hash value previously generated by the controller and stored in the unsecure mass storage memory for the one portion of the plurality of portions of the first level firmware; and preventing execution of the first level firmware if the generated hash value does not match the stored hash value.

20. The method of claim 19 further comprising:
 (a) reading a next portion of the plurality of portions of the first level firmware;
 (b) generating a next hash value for the next portion;
 (c) comparing the generated next hash value to a next stored hash value for the next portion;
 (d) preventing execution of the first level firmware if the generated next hash value does not match the next stored hash value; and
 (e) repeating (a)-(d) for each of the plurality of portions until all of the first level firmware has been authenticated.

21. A method of operating a flash memory device comprising a controller and unsecure mass storage, the method comprising:

storing firmware in the unsecure mass storage, the firmware comprising a first level and a second level, wherein the first level includes a boot loader that is stored in an exclusively physically addressed partition of the unsecure mass storage without logical mapping, and the second level is stored in a logical partition of the unsecure mass storage having logical mapping;

signing the firmware with the controller of the flash memory device while the firmware is being stored in the unsecure mass storage and storing a signature generated by the controller for the firmware in the unsecure mass storage;

reading the firmware stored in the unsecure mass storage and, prior to execution of the firmware, verifying authenticity of the firmware as it is read from the unsecure mass storage;

wherein verifying authenticity comprises the controller of the flash memory device generating a signature for the firmware read from the unsecure mass storage and comparing the generated signature with the signature stored in the unsecure mass storage; and wherein the first level firmware is read without performing logical mapping and the second level firmware is moveable in the logical partition by a wear leveling routine.

\* \* \* \* \*

UNITED STATES PATENT AND TRADEMARK OFFICE
CERTIFICATE OF CORRECTION

| | | |
|---|---|---|
| PATENT NO. | : 7,934,049 B2 | Page 1 of 1 |
| APPLICATION NO. | : 11/317341 | |
| DATED | : April 26, 2011 | |
| INVENTOR(S) | : Holtzman et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 88 days.

Signed and Sealed this
Fourth Day of October, 2011

David J. Kappos
*Director of the United States Patent and Trademark Office*